US008684519B2

(12) United States Patent
Coleman

(10) Patent No.: US 8,684,519 B2
(45) Date of Patent: Apr. 1, 2014

(54) DUAL EYEGLASSES

(75) Inventor: Harry E. Coleman, Arch Cape, OR (US)

(73) Assignee: Harry E. Coleman, IV, Arch Cape, OR (US), Trustee of the "Butch" Coleman Trust dated Jan. 4, 2010

( * ) Notice: Subject to any disclaimer, the term of this patent is extended or adjusted under 35 U.S.C. 154(b) by 343 days.

(21) Appl. No.: 13/170,071

(22) Filed: Jun. 27, 2011

(65) Prior Publication Data

US 2012/0327359 A1  Dec. 27, 2012

(51) Int. Cl.
*G02C 1/00* (2006.01)
(52) U.S. Cl.
USPC .............................. 351/158; 351/41; 351/156
(58) Field of Classification Search
USPC ................. 351/156, 157, 158, 47, 57, 41
See application file for complete search history.

(56) References Cited

U.S. PATENT DOCUMENTS

| 5,384,604 | A | 1/1995 | Chang |
| D391,981 | S | 3/1998 | Chang |
| 6,427,254 | B1 | 8/2002 | Gardner |
| 6,789,893 | B1 | 9/2004 | Hong |
| 6,899,423 | B1 * | 5/2005 | Brazell ..................... 351/157 |
| 6,971,744 | B1 | 12/2005 | Cummings |
| 7,347,544 | B1 | 3/2008 | McLaughlin |
| D604,353 | S | 11/2009 | Pineiro |
| 7,780,289 | B2 | 8/2010 | Pettingill |

FOREIGN PATENT DOCUMENTS

| CN | 201503518 U | 6/2010 |
| CN | 201569802 U | 9/2010 |
| WO | WO2005081049 A1 | 9/2005 |

* cited by examiner

*Primary Examiner* — Hung Dang
(74) *Attorney, Agent, or Firm* — Schwabe, Williamson & Wyatt

(57) ABSTRACT

Embodiments herein provide dual eyeglasses including a first set of eyeglasses and a second set of eyeglasses rigidly coupled to each other at the earpieces. The first and second sets of eyeglasses may be coupled together in an opposing arrangement, so that when one set of eyeglasses is worn on the face of a user, the other set is disposed behind the user's head. Some embodiments may include an eyeglass connector that may be used to rigidly couple two sets of eyeglasses together. Other embodiments may include a set of eyeglasses having a coupling mechanism integrated into the earpieces for rigidly coupling the eyeglasses to another set of eyeglasses. In yet other embodiments, the two sets of eyeglasses may be permanently coupled together. For example, the two sets of eyeglasses may be of a single construction.

20 Claims, 4 Drawing Sheets

DUAL EYEGLASSES

TECHNICAL FIELD

Embodiments of the present disclosure relate generally to the field of eyeglasses.

BACKGROUND

Eyeglasses are widely used to correct vision, protect the eyes from the sun or debris and/or for other purposes. Many people have multiple sets of eyeglasses that provide different functions, such as one set of sunglasses and one set of reading glasses. However, when a user is wearing one set of eyeglasses, it can be difficult and inconvenient to find a place to store the second set of eyeglasses, especially when the user is not at home. This may lead to the second set of eyeglasses becoming lost or damaged.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
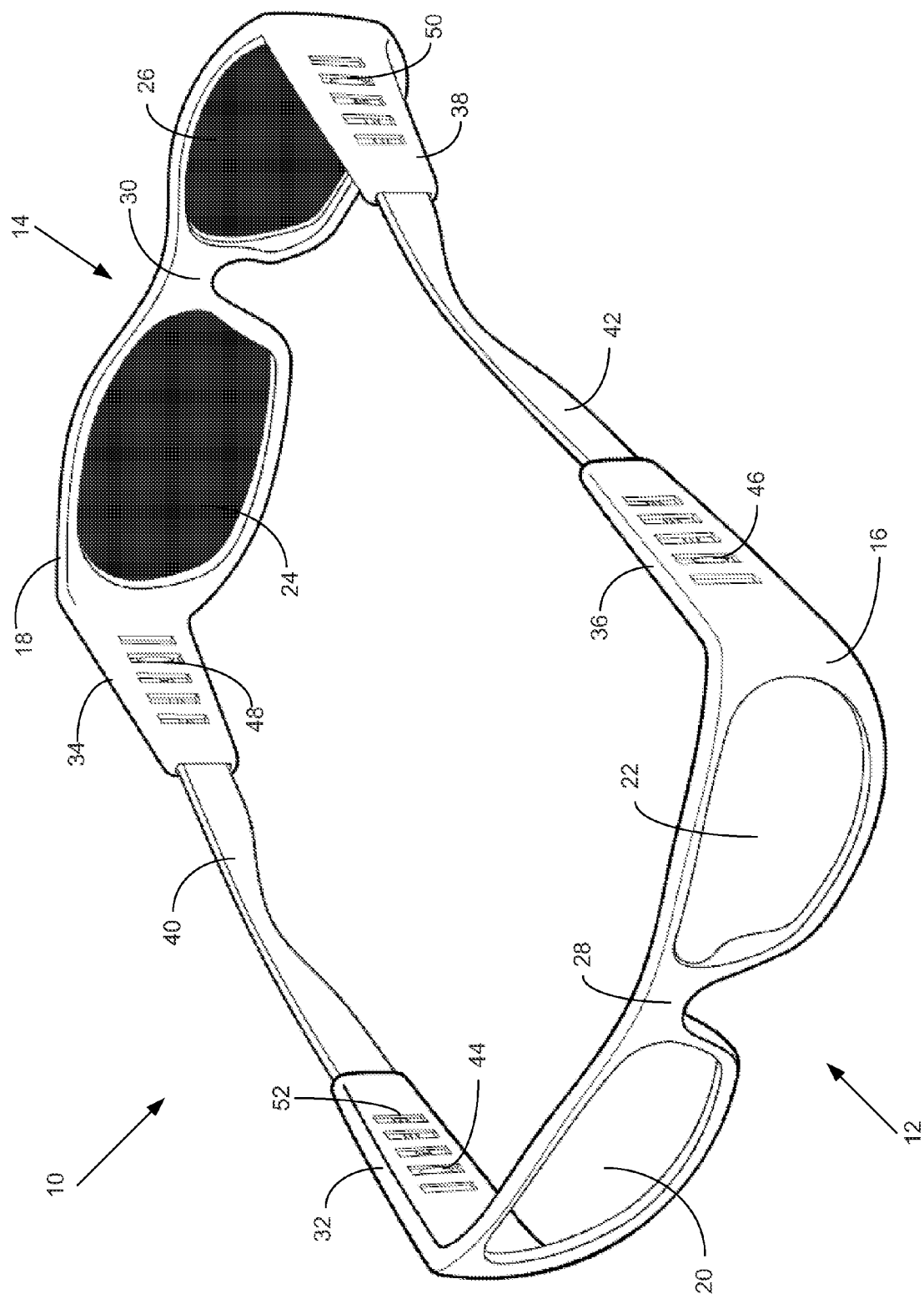
FIG. 1A illustrates a perspective view of dual eyeglasses having two sets of eyeglasses rigidly coupled together by a pair of eyeglass connectors, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for dual eyeglasses are provided.

Embodiments herein provide dual eyeglasses including a first set of eyeglasses and a second set of eyeglasses rigidly coupled to each other at the earpieces. The first and second sets of eyeglasses may be coupled together in an opposing arrangement, so that when one set of eyeglasses is worn on the face of a user, the other set is disposed behind the user's head. Some embodiments may include an eyeglass connector that may be used to rigidly couple two sets of eyeglasses together. Other embodiments may include a set of eyeglasses having a coupling mechanism integrated into the earpieces for rigidly coupling the eyeglasses to another set of eyeglasses. In yet other embodiments, the two sets of eyeglasses may be permanently coupled together. For example, the two sets of eyeglasses may be of a single construction.

Figure 1B:
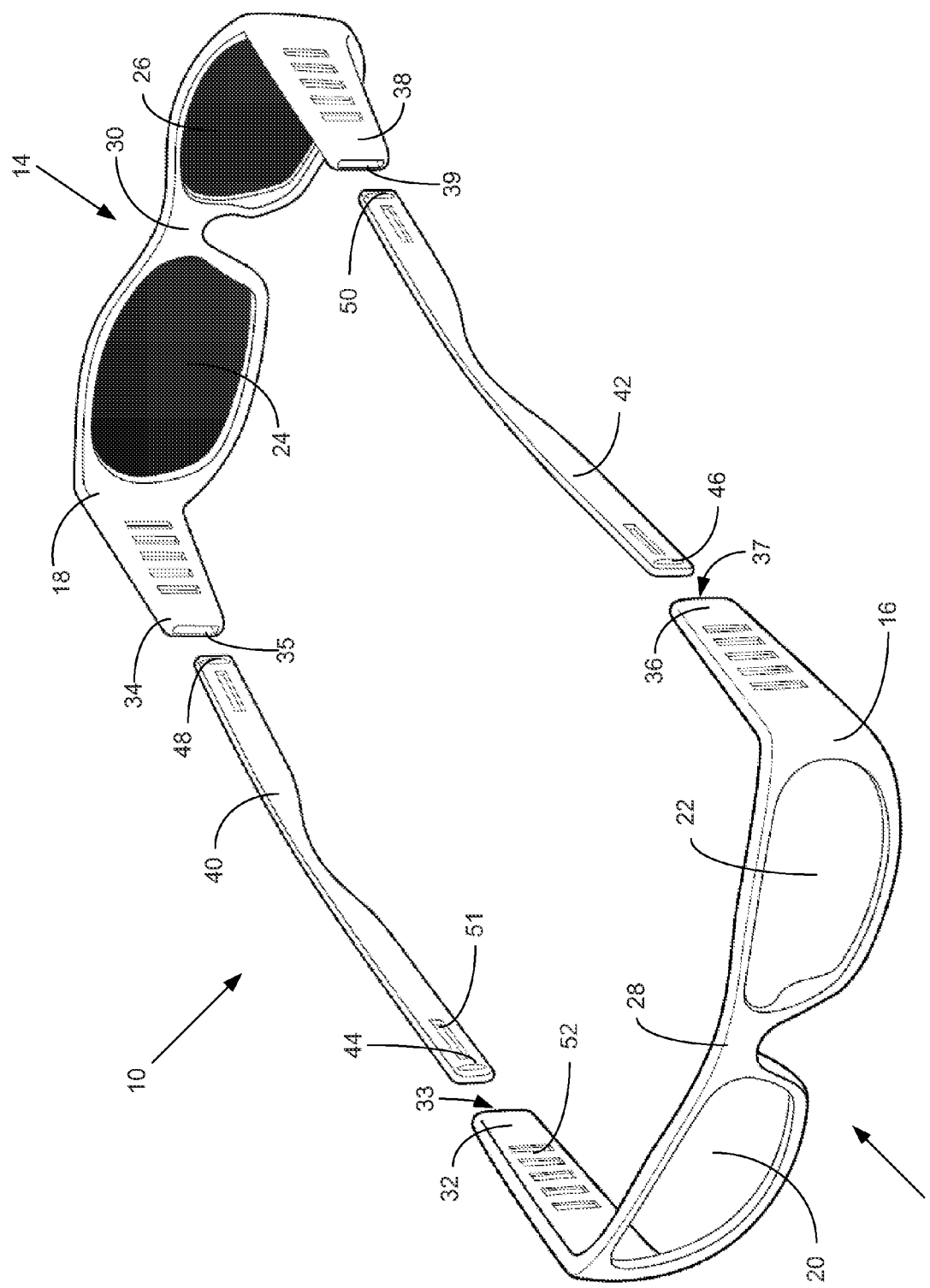
FIG. 1B illustrates an exploded view of the eyeglasses and eyeglass connectors of FIG. 1A.

As shown in FIGS. 1A-E, dual eyeglasses 10 may include a first set of eyeglasses 12 and a second set of eyeglasses 14. First set 12 and second set 14 may each have a frame 16 or 18 that houses a pair of lenses 20, 22, 24, or 26 and includes a bridge 28 or 30, respectively, adapted to rest on the nose of a user. Each set of eyeglasses 12 or 14 may further include a first earpiece 32 or 34, and a second earpiece 36 or 38, respectively, coupled to the frame 16 or 18. The earpieces 32, 34, 36 and 38 may extend from opposite ends of the respective frame, toward the ears of the user when the eyeglasses are worn. The earpieces 32, 34, 36, and 38 may or may not reach the ears of the user when the eyeglasses are worn. In some embodiments, the earpieces 32, 34, 36, and 38 may be coupled to the respective frame 16 or 18 by a hinge (not shown). In other embodiments, as shown in FIGS. 1A-B, the eyeglasses 12 or 14 may not include hinges between the frame 16 or 18 and earpieces 32, 34, 36, or 38, respectively.

In various embodiments, dual eyeglasses 10 may include a first eyeglass connector 40 and a second eyeglass connector 42. First eyeglass connector 40 may rigidly couple the first ear piece 32 of the first set of eyeglasses 12 to the first earpiece 34 of the second set of eyeglasses 14. Similarly, the second eyeglass connector 42 may rigidly couple the second ear piece 36 of the first set of eyeglasses 12 to the second earpiece 38 of the second set of eyeglasses 14, so that the frames 16 and 18 of the eyeglasses 12 and 14 oppose each other. Accordingly, when the first set of eyeglasses 12 is worn by the user, the frame 18 of the second set of eyeglasses 14 may be disposed behind the user's head. The first and second sets of eyeglasses 12 and 14 may be coupled together so that both sets are right-side up (i.e., the bridges 28 and 30 are oriented in substantially the same direction) or so that the second set is upside down relative to the first set.

In various embodiments, the lenses 20 and 22 of the first set of eyeglasses 12 may be of a different type than the lenses 24 and 26 of the second set of eyeglasses 14. The rigid coupling of the first eyeglasses 12 and second eyeglasses 14 may allow the user to easily switch between one type of lenses and another. Furthermore, the set of eyeglasses that is not in use may be conveniently stored behind the head of the user. The lenses 20, 22, 24, and 26 may be any suitable type of lenses, including but not limited to sunglass lenses, corrective lenses, safety lenses, polarized lenses, and/or three dimensional (3-D) lenses.

In some embodiments, the eyeglasses 12 and 14 may be of substantially similar design, and may differ only in the type of lenses included. The similar design may allow the same mold to be used to manufacture both the first and second eyeglasses 12 and 14, which may improving the efficiency and lower the costs of manufacturing and/or provide an aesthetically pleasing look. In other embodiments, the eyeglasses 12 and 14 may be of different designs.

Figure 1E:
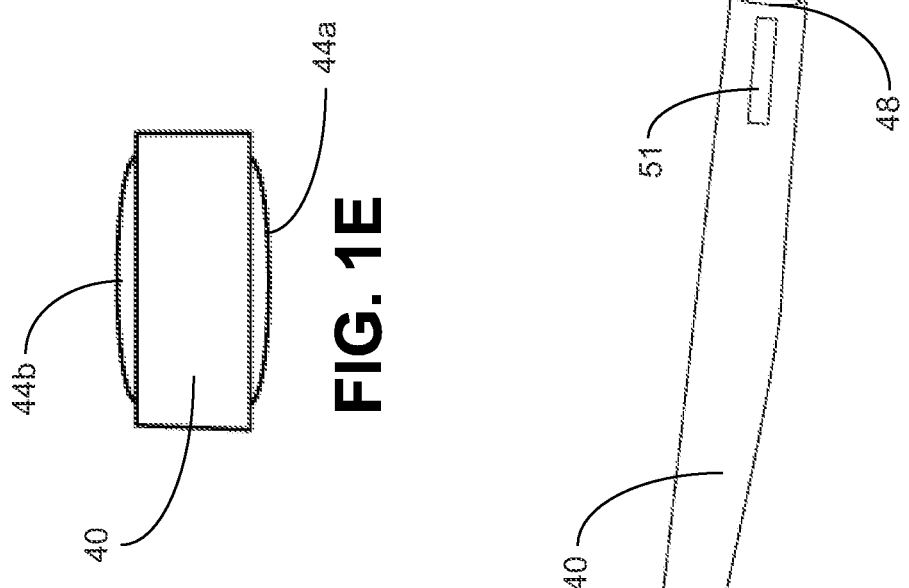
FIG. 1E illustrates a magnified end view of the eyeglass connector of FIG. 1C
Figure 1C:
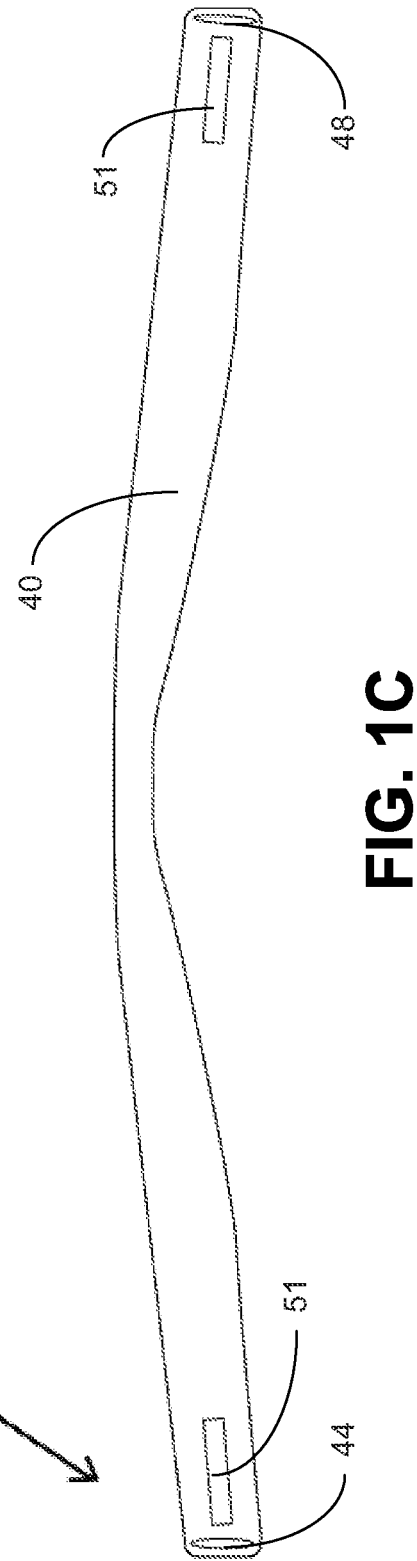
FIG. 1C illustrates a side view of the eyeglass connector of FIGS. 1A and 1B.
Figure 1D:
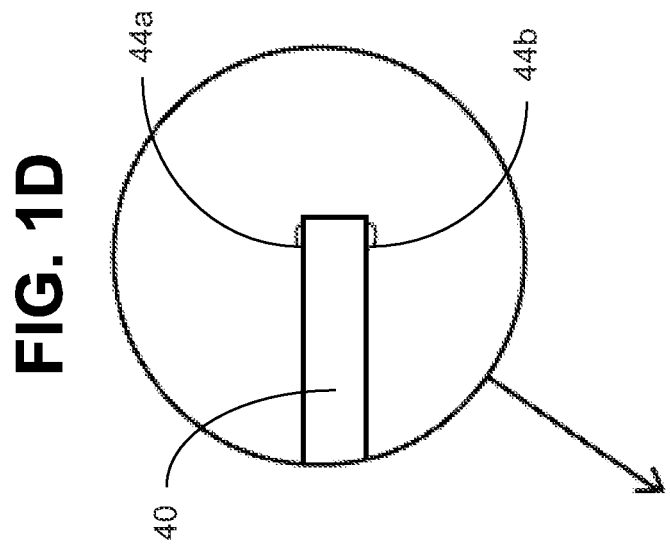
FIG. 1D illustrates a magnified top view of the eyeglass connector of FIG. 1C.

In some embodiments, the eyeglass connectors 40 and 42 may be rigidly coupled to the earpieces of the eyeglasses by a snap interface. For example, as shown in FIGS. 1A-E, the eyeglass connectors 40 and 42 may each include a protrusion 44, 46, 48, or 50 of material on one or both sides of each end of the connector 40 or 42 that protrudes from the surface of the connector 40 or 42. As best shown in FIGS. 1D and 1E, the protrusion 44 may include protrusions 44a and 44b extending from opposite sides of an end portion of the connector 40. The other protrusions 46, 48, and/or 50 may be similarly constructed.

As shown in FIGS. 1A-B, the earpieces 32, 34, 36, and 38 of the eyeglasses 12 or 14 may each include a hollow portion 33, 35, 37, or 39, respectively, that receives an end portion of one of the connectors 40 or 42. The hollow portions 33, 35, 37, and 39 may each include one or more slots 52 to receive the respective protrusion 44, 46, 48, or 50 and secure the connector in place. The slots 52 may be on one or both sides of the hollow portion 33, 35, 37, or 39. The connectors 40 and 42 may have one or more openings 51 at or near the end portions, which may make the connector more pliable at the end portions, facilitating insertion into the respective hollow portion of the earpiece. Furthermore, in some embodiments, the connectors 40 and 42 and/or hollow portions 33, 35, 37, and 39 may include one or more guide rails, lips, notches and/or other features to facilitate insertion and removal of the connectors 40 and 42.

In some embodiments, the protrusions 44, 46, 48, and 50 may include a leading edge with a rounded and/or slanted shape so that the protrusion may be moved to an adjacent slot 52 by applying force to the connector 40 or 42. Similarly, in some embodiments, the protrusions 44, 46, 48, and 50 may include a trailing edge with a rounded and/or slanted shape so that connector 40 or 42 may be removed from the respective earpiece by applying force to the connector 40 or 42 in a direction away from the earpiece. The protrusion 44, 46, 48, and 50 may be made of a more flexible material than the body of the eyeglass connector 40 or 42 to facilitate insertion and/or removal of the connector 40 or 42 from the respective earpiece. For example, the protrusions may be made of rubber, plastic, and/or another suitable material.

In other embodiments, the protrusion 44, 46, 48, or 50 may be depressed by the user to disengage the protrusion from the slot 52 so that the connector 40 or 42 may be removed. The protrusion may be compressible between an extended state, in which the protrusion secures the connector to the earpiece, and a retracted state, in which the connector may be removed from the earpiece. The protrusion may be biased in the extended state by a biasing device, such as a spring.

In use, with the first and second sets of eyeglasses 12 and 14 coupled together, the user may use the first set of eyeglasses 12 by placing the head through the opening between the first and second sets of eyeglasses 12 and 14 and placing the bridge 28 of the first set of eyeglasses on the user's nose. The first and second eyeglass connectors 40 and 42 may rest on or near the ears. If the user then wants to use the second set of eyeglasses 14, the user may rotate the dual eyeglasses 10 so that the bridge 30 of the second set of eyeglasses 14 rests on the user's nose. Since the two sets of eyeglasses 12 and 14 are rigidly coupled together in an opposing arrangement, when the user wears one set of eyeglasses, the other set sits behind the head. This arrangement may provide comfortable and convenient storage for the set of eyeglasses that is not in use. Additionally, the set of eyeglasses behind the head may enhance the fit and/or security of the set being used by the user by preventing the eyeglasses from falling off the user's head.

As an example, the first set of eyeglasses 12 may be corrective eyeglasses and the second set of eyeglasses 14 may be sunglasses. The user may use the corrective eyeglasses when desired, such as while indoors and/or when vision correction is required, e.g., while reading. The user may switch to the sunglasses when desired, such as while outdoors.

Additionally, one or both of the sets of eyeglasses may be uncoupled and coupled to a set of eyeglasses of a different type. It should be apparent to those skilled in the art that any number of combinations of different types and/or designs of eyeglasses are possible. Additionally, the arrangement of the eyeglass couplers 40 and 42 shown in FIGS. 1A-B, either of the sets of eyeglasses may also be worn independently, without the other set of eyeglasses attached.

In alternative embodiments, the eyeglass connectors may be integrated into the first and second sets of eyeglasses. By integrated, it is meant that the eyeglass connector may be a portion of the same construction as one of the earpieces.

In other embodiments, the first and second set of eyeglasses may permanently or semi-permanently coupled together at the earpieces. For example, the first and second sets of eyeglasses may be components of the same construction. In some embodiments, the first and second set of eyeglasses may share the same earpieces. For example, a first earpiece and second earpiece may each be coupled to both the frame of the first set of eyeglasses and the frame of the second set of eyeglasses. Alternatively, the earpieces of the first and second sets of eyeglasses may be coupled together in a permanent or semi-permanent manner, such as with an adhesive.

Figure 2A:
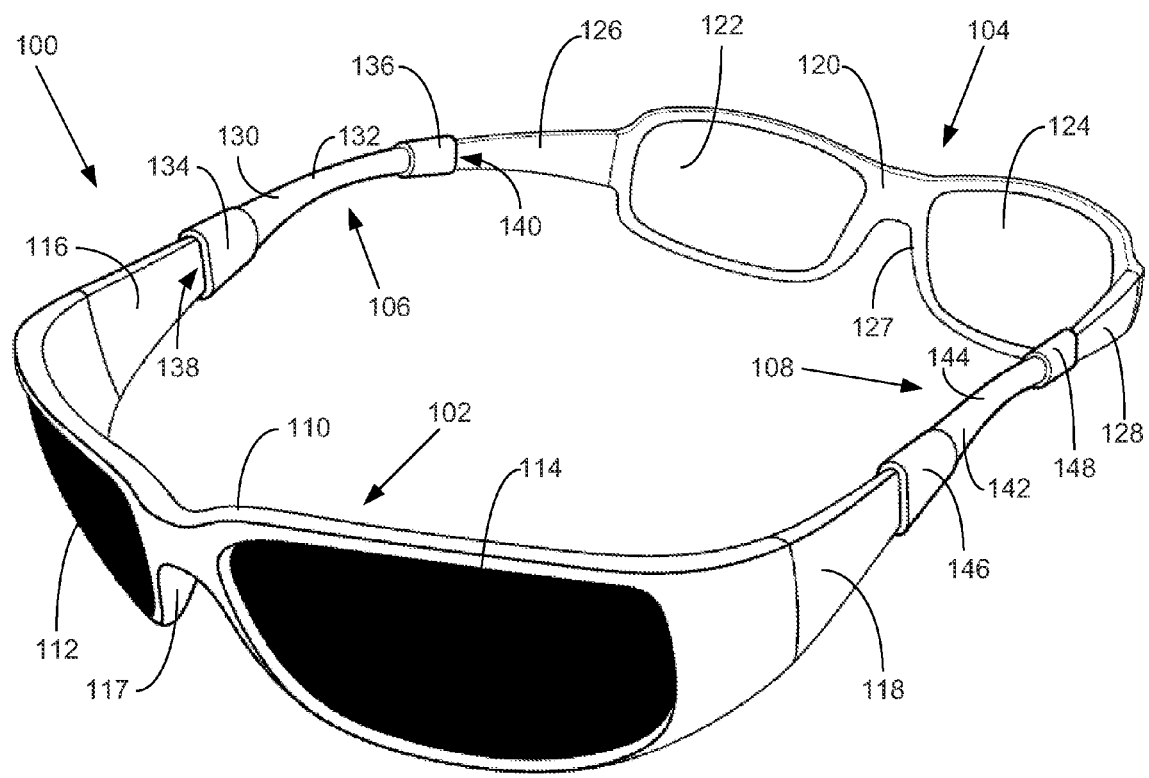
FIG. 2A illustrates a perspective view of an alternative embodiment of dual eyeglasses having two sets of eyeglasses rigidly coupled together by a pair of eyeglass connectors.
Figure 2B:
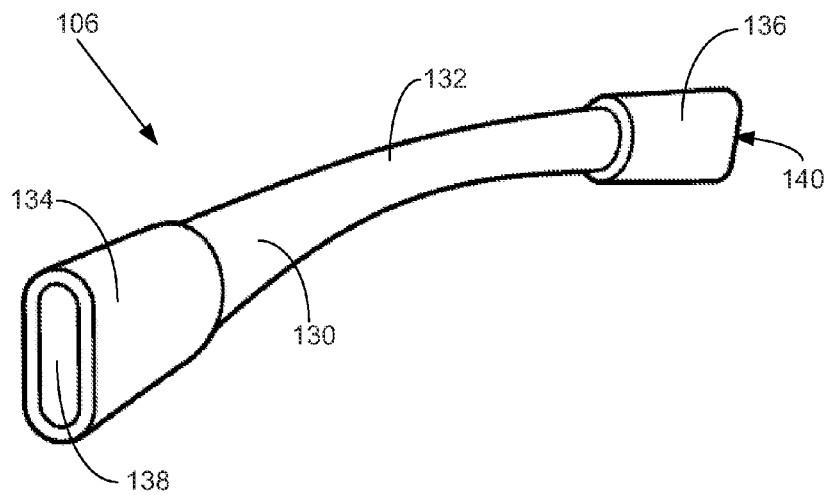
FIG. 2B illustrates a perspective view of the eyeglass connector of FIG. 2A.

In another alternative embodiment, as shown in FIG. 2A, dual eyeglasses 100 may include a first set of eyeglasses 102 rigidly coupled with a second set of eyeglasses 104 by a pair of rigid eyeglass connectors 106 and 108 comprising hollow tubes. A separate view of eyeglass connector 106 is shown in FIG. 2B. As shown in FIG. 2A, first set of eyeglasses 102 includes a frame 110 that houses lenses 112 and 114. First set of eyeglasses 102 further includes a first earpiece 116 and a second earpiece 118 coupled to frame 110, and a bridge 117. Similarly, second set of eyeglasses 104 includes a frame 120 that houses lenses 122 and 124, and further includes a first earpiece 126 and a second earpiece 128 coupled to frame 120, and a bridge 127.

Eyeglass connector 106 includes a hollow tube 130 with a bend 132. Eyeglass connector 106 further includes flanges 134 and 136 on the ends of eyeglass connector 106 with openings 138 and 140, respectively. The first earpiece 116 of the first set of eyeglasses 102 is disposed in the opening 138 of eyeglass connector 106, while the first earpiece 126 of the second set of eyeglasses 104 is disposed in the opening 140 on the other end of eyeglass connector 106. Hollow tube 130 may be substantially rigid to provide a rigid coupling between the first earpieces 116 and 126 of the first set of eyeglasses and the second set of eyeglasses, respectively. Flanges 134 and 136 may be of a more flexible and/or elastic material than hollow tube 130 to facilitate the coupling of earpieces 116 and 126, respectively. Flanges 134 and 136 may substantially conform to the shape of the respective earpiece, providing an interference fit with the earpiece.

Eyeglass connector 108 is arranged in a similar manner to eyeglass connector 106 and forms a rigid coupling between the second earpieces 118 and 128 of the first set of eyeglasses 102 and second set of eyeglasses 104, respectively. Eyeglass connector 108 includes a hollow tube 142 with a bend 144 and flanges 146 and 148 on each end.

In use, either first set of eyeglasses 102 or second set of eyeglasses 104 may be worn on the face of a user (not shown). When the first set of eyeglasses 102 is worn on the face of the user, the second set of eyeglasses 104 is disposed behind the head of the user. Similarly, when the second set of eyeglasses 104 is worn on the face of the user, the first set of eyeglasses 102 is disposed behind the head of the user. Accordingly, the rigid coupling allows the second set of eyeglasses to be stored conveniently behind the head when the first set of eyeglasses is in use.

The bend 132 and 142 in eyeglass connectors 106 and 108, respectively, may rest on the ears of the user, providing a comfortable and secure fit for the dual glasses 100. Additionally, the bend 132 and 140 may allow the set of eyeglasses that is not worn on the face to be disposed on the lower part of the back of the head and/or on the back of the neck, which may improve comfort and security of dual glasses 100.

The hollow tube 130 may provide a releasable coupling so that one or both of the first set of eyeglasses 102 and second set of eyeglasses 104 may be replaced with a different set of eyeglasses. In some embodiments, the eyeglass connectors 106 and 108 may be used with conventional eyeglasses that were not specifically designed to be used with the eyeglass connector.

The earpieces may or may not contact each other while disposed in the hollow tube 130. In some embodiments, the earpieces may overlap in a portion of the tube, i.e., occupy the same portion of the length of the tube. In these embodiments, the tube may be hollow throughout the length of the tube. The overlap may facilitate the rigid coupling of the earpieces. Additionally, more flexibility and/or elasticity may be allowed in the hollow tube while still maintaining a rigid coupling between the earpieces.

In other embodiments, the tube may not be hollow throughout its length. The tube may have a hollow portion at each end and a substantially solid portion separating the hollow portions. The earpieces may be inserted in the opening at each end of the tube to form a rigid coupling.

In various embodiments, the tube may have any suitable shape, such as straight, bent, and/or curved. In some embodiments, the hollow portions of the tube may be configured to fit with one or more earpiece designs.

Similarly, the shape of the tube may be configured to provide the desired orientation of the second set of eyeglasses on the back of the user's head. For example, when used with eyeglasses having substantially straight earpieces, a bend in the tube may be provided to orient the second set of eyeglasses on the lower portion of the back of the head and/or on the neck. The bend may also facilitate coupling a set of eyeglasses that includes bent earpieces. In some embodiments, one or more hollow portions of the tube may include a bend, and the bent earpieces may be placed in the hollow portion of the tube over the bend. In other embodiments, a distal portion of the bent earpiece, i.e., a portion of the earpiece on the side of the bend away from the frame, may be placed in one side of the hollow tube in the upside down orientation with respect to the other set of eyeglasses in order to provide an orientation that may be suitable for placing around the back of the head and/or neck.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A dual eyeglasses apparatus comprising:
a first set of eyeglasses having a frame, a pair of lenses coupled to the frame, and a first earpiece and a second earpiece extending from the frame;
a second set of eyeglasses having a frame, a pair of lenses coupled to the frame, and a first earpiece and a second earpiece extending from the frame, the first earpiece of the second set of eyeglasses rigidly coupled to the first earpiece of the first set of eyeglasses and the second earpiece of the second set of eyeglasses rigidly coupled to the second earpiece of the first set of eyeglasses;
wherein the first set of eyeglasses and second set of eyeglasses are coupled in an opposing arrangement so that when the frame of the first set of eyeglasses is worn on a face of a user, the frame of the second set of eyeglasses is disposed behind the head of the user.

2. The dual eyeglasses of claim 1, further comprising:
a first eyeglass connector releasably and rigidly coupling the first earpiece of the first set of eyeglasses to the first earpiece of the second set of eyeglasses; and
a second eyeglass connector releasably and rigidly coupling the second earpiece of the first set of eyeglasses to the second earpiece of the second set of eyeglasses.

3. The dual eyeglasses of claim 2, wherein the first and second earpieces of the first and second sets of eyeglasses each includes a hollow portion with an opening to receive an end portion of the respective eyeglass connector.

4. The dual eyeglasses of claim 3, wherein the hollow portions of the earpieces each have one or more slots, and the first and second eyeglass connectors each include one or more protrusions extending from a surface of the eyeglass connector to interact with the one or more slots to form the releasable and rigid coupling between the earpieces of the first and second sets of eyeglasses.

5. The dual eyeglasses of claim 4, wherein at least one of the first and second earpieces of the first and second sets of eyeglasses has a plurality of slots at different locations along a length of the earpiece for receiving the protrusion of the eyeglass connector.

6. The dual eyeglasses of claim 5 wherein a leading edge of the one or more protrusions is slanted to facilitate moving the protrusion from one slot to another slot.

7. The dual eyeglasses of claim 4 wherein a trailing edge of the one or more protrusions is curved and/or slated to facilitate removing the eyeglass connector from the earpiece when force is applied to the eyeglass connector away from the earpiece.

8. The dual eyeglasses of claim 4, wherein the protrusion is made of a more flexible material than a body of the eyeglass connector to facilitate insertion and/or removal of the protrusion from the one or more slots of the earpiece.

9. The dual eyeglasses of claim 4, wherein the protrusion is compressible between an extended position and a retracted position, the protrusion being biased in the extended position.

10. The dual eyeglasses of claim 2, the first and second eyeglass connectors each comprising a tube having a first opening on a first end of the tube and a second opening on a second end of the tube, wherein the first earpiece of the first set of eyeglasses is disposed through the first opening of the first eyeglass connector, the first earpiece of the second set of eyeglasses is disposed through the second opening of the first eyeglass connector, the second earpiece of the first set of eyeglasses is disposed through the first opening of the second eyeglass connector, and the second earpiece of the second set of eyeglasses is disposed through the second opening of the second eyeglass connector.

11. The dual eyeglasses of claim 10 wherein the first and second eyeglass connectors further comprise flanges on the first and second ends of the tube, the flanges being of a more flexible material than the tube.

12. The dual eyeglasses of claim 1 wherein the lenses of the first set of eyeglasses are of a different type than the lenses of the second set of eyeglasses.

13. A first set of eyeglasses comprising:
a frame;
a pair of lenses coupled to the frame; and
a first earpiece and a second earpiece extending from opposite ends of the frame, at least one of the first earpiece and second earpiece including a coupling mechanism configured to rigidly couple the at least one of the first earpiece and the second earpiece with an earpiece of a second set of eyeglasses to rigidly couple the first set of eyeglasses to the second set of eyeglasses in an opposing arrangement so that when the frame of the first set of eyeglasses is worn on a face of a user, a frame of the second set of eyeglasses is disposed behind the head of the user.

14. The set of eyeglasses of claim 13, wherein at least one of the first and second earpiece includes a hollow portion with an opening to receive the earpiece from the second set of eyeglasses and/or an eyeglass connector coupled to the earpiece of the second set of eyeglasses.

15. The set of eyeglasses of claim 14, wherein the hollow portion includes one or more slots configured to receive a protrusion to form the rigid coupling with the earpiece of the second set of eyeglasses.

16. An eyeglass connector comprising:
a tube having a first opening at a first end leading to a first hollow portion and a second opening at a second end leading to a second hollow portion, the tube configured to rigidly couple a first earpiece of a first set of eyeglasses to a first earpiece of a second set of eyeglasses when the first earpiece of the first set of eyeglasses is disposed through the first opening in the tube and the first earpiece of the second set of eyeglasses is disposed through the second opening of the tube;
wherein the tube is configured to rigidly couple the first set of eyeglasses and the second set of eyeglasses in an opposing arrangement so that when a frame of the first set of eyeglasses is worn on a face of a user, a frame of the second set of eyeglasses is disposed behind the head of the user.

17. The eyeglass connector of claim 16 wherein the tube includes a flange coupled to at least one of the first end and the second end configured to form an interference fit with the earpiece.

18. The eyeglass connector of claim 16 wherein the tube includes a bend.

19. The eyeglass connector of claim 16 wherein the tube is hollow throughout a length of the tube.

20. The eyeglass connector of claim 16 wherein the first hollow portion and the second hollow portion are separated by a substantially solid portion.

* * * * *